United States Patent Office 3,287,456
Patented Nov. 22, 1966

3,287,456
BISMUTH IODIDE COMPLEX OF SALTS OF RACEMIC 2-DEHYDROEMETINE
Arnold Brossi, Verona, N.J., assignor to Hoffmann-La Roche Inc., Nutley, N.J., a corporation of New Jersey
No Drawing. Filed July 13, 1964, Ser. No. 382,340
Claims priority, applications Switzerland, July 22, 1963 and June 2, 1964, 9,118/63
1 Claim. (Cl. 260—270)

The present invention relates to novel bismuth iodide organic complexes and to a process for preparing same. More particularly, the present invention relates to bismuth iodide complexes of 2-dehydroemetine and pharmaceutically acceptable salts thereof and to a process for the manufacture of such bismuth iodide complexes.

2-dehydroemetine is 2-(6′,7′-dimethoxy-1′,2′,3′,4′-tetrahydro - 1′ - isoquinolylmethyl)-3-ethyl-9,10-dimethoxy-1,4,6,7-tetrahydro-11bH-benzo[a] quinolizine. 2-dehydroemetine possesses two asymmetrical centers. Thus, there are possible 4-optical antipodes or 2-racemates thereof. The expression "2-dehydroemetine" as used throughout the specification is intended to encompass all such forms thereof. Thus, it will accordingly be appreciated that the expression "2-dehydroemetine" as used herein connotes the optical antipodes thereof, particularly, (-)-2-dehydroemetine as well as the racemates thereof.

The novel process aspect of the present invention involves the reaction of a bismuth iodide complex salt with a member selected from the group consisting of 2-dehydroemetine and acid addition salts thereof with pharmaceutically acceptable acids whereby to form the said new and useful bismuth iodide complex of 2-dehydroemetine.

2-dehydroemetine is characterized by its amoebicidal activity and thus, is extremely useful in the control of amoebic dysentery. However, 2-dehydroemetine suffers from the defect of being unsuitable for oral administration due to the likelihood of undesirable side effects occurring when this substance is administered by this route.

The bismuth iodide complex of 2-dehydroemetine of the present invention, however, while being characterized by its ability to control amoebic dysentery and bilharziosis, can be administered orally without significant undesirable side effects occurring. Thus, it is unexpectedly superior to 2-dehydroemetine per se, insofar as its capability of being administered orally is concerned. The present invention therefor provides a novel class of pharmaceutically desirable products which are suitable for oral administration.

Among the acid addition salts of 2-dehydroemetine with pharmaceutically acceptable acids suitable for use in the process of the present invention may be included salts thereof with weak organic acids such as aliphatic carboxylic acids, for example, formic acid, acetic acid, propionic acid, tartaric acid, oxalic acid, lactic acid and the like, and, salts with weak inorganic acids, e.g. the hydroiodic acid salt of 2-dehydroemetine and the like.

Salts of 2-dehydroemetine with strong acids can also be employed in the novel process aspect of the present invention. However, this procedure is less preferred since it may result in the end product containing undesired anionic impurities (chloride ions). However, such anionic impurities will not be present in sufficient quantities as to affect the use of the end products for pharmaceutical purposes.

A preferred salt suitable for the use as a starting material in the process aspect of the present invention is the acetate salt of 2-dehydroemetine. Either the acetate salt per se can be provided for use in the preferred process aspect or a salt of 2-dehydroemetine, for example, a 2-dehydroemetine hydrohalide salt, can be neutralized to the free base, the so-formed free base can be added to an appropriate amount of acetic acid and the resultant acetic acid salt of 2-dehydroemetine can be reacted with the bismuth iodide inorganic complex salt whereby to form the desired complex.

Among the bismuth iodide complex salts suitable for the purposes of the present invention may be included any inorganic salt which contains the anion $[BiI_4]^-$ and which will form a bismuth iodide complex with 2-dehydroemetine or its pharmaceutically acceptable acid addition salts. Thus, alkali-metal bismuth iodides such as potassium bismuth iodide or ammonium bismuth iodide are suitable for the purposes of the present invention. If an alkali-metal bismuth iodide is employed in the process of the present invention, it can be prepared, in situ, from bismuth oxide $(Bi_2O_3)$ in any conveniently available alkali metal iodide such as potassium iodide.

The bismuth iodide complexes of 2-dehydroemetine of the present invention have the empirical formula $$C_{29}H_{38}O_4N_2 \cdot BiI_3$$

The bismuth iodide complexes of pharmaceutically acceptable acid addition salts of 2-dehydroemetine have the empirical formula $C_{29}H_{38}O_4N_2 \cdot BiI_3 \cdot acid$. The ratio of the 2-dehydroemetine moiety to the bismuth iodide moiety in the complex may vary within wide limits. However, preferably, there is complexed with every one part of the 2-dehydroemetine moiety of the empirical formula $$C_{29}H_{38}O_4N_2$$

from about 0.7 to about 2.0 parts of the bismuth iodide moiety of empirical formula $BiI_3$. Still more preferably, there is complexed with every 1 part of the 2-dehydroemetine moiety, from about 0.80 part to about 1.50 parts of the bismuth iodide moiety. The acid portion of the complex can similarly vary in the ratio of from about 0.7 to about 2.0 parts thereof for every one part of the 2-dehydroemetine moiety.

Thus, the novel product of the present invention is a bismuth iodide complex of a member selected from the group consisting of 2-dehydroemetine and acid addition salts thereof with pharmaceutically acceptable acid, there being present in the complex for every 1 part of the dehydroemetine moiety from about 0.7 to about 2.0 parts of the $BiI_3$ moiety. Advantageously, the product is a bismuth iodide complex of the hydroiodic salt of 2-dehydroemetine.

The complexes obtainable according to the process of the present invention are, as is noted above, useful as amoebicidal agents. As similarly noted above, unlike 2-dehydroemetine per se which is unsuitable for oral administration because of the likelihood of unwanted side effects occurring, the complexes of the present invention are especially adapted for oral use. Thus, they can be ingested orally in capsule form, particularly, in a capsule which is resistant to gastric juices, with dosage adjusted to suit individual needs.

The following examples are illustrative but not limitative of the present invention. All temperatures stated are in degrees centigrade.

Example 1

25.0 grams of racemic 2-dehydroemetine dihydrochloride (moisture content 2.3 percent) and 40 grams of ice were suspended in 160 ml. of water. After the addition of 11 ml. of 30 percent sodium hydroxide solution, the reaction mixture was extracted 3 times with chloroform. The chloroform extracts were combined and evaporated. The residue which contains racemic 2-dehydroemetine as the free base was dissolved in 125 ml. of glacial acetic acid. To the resultant solution, there was rapidly added at a temperature of about 25°, a solution prepared by combining 103 ml. of saturated potassium iodide solution, 10.3 grams of bismuth-(III)-oxide and 255 ml. of glacial acetic acid. The resultant mixture was stirred for a period of one hour. An orange-red precipitate which formed was separated by filtration, washed several times with water and then dried under reduced pressure at 45°. The so-dried material was added with stirring to a solution of 50 ml. of ethanol in 50 ml. of water, and the stirring was continued after the addition was completed. After drying under reduced pressure, (12 mm. Hg) at 45°, there was obtained the bismuth iodide complex of the hydroiodic acid salt of racemic-2-dehydroemetine as an orange-red powder of the following composition: $C_{29}H_{38}O_4N_2 \cdot 2HI \cdot 1.16BiI_3$.

*Example 2*

The free base of racemic 2-dehydroemetine was prepared as in Example 1 from 100 grams of racemic 2-dehydroemetine dihydrochloride and then dissolved in 600 ml. of glacial acetic acid. To the resultant solution, there was added at a temperature of 40° with stirring, 900 ml. of a potassium bismuth iodide solution. After such addition was completed, the resultant mixture was stirred for a period of about 1 hour and then filtered. The vermillion residue remaining on the filter was washed portionwise with 300 ml. of water and then dried at 50° in a vacuum drying oven, yielding the bismuth iodide complex of the hydroiodic salt of racemic 2-dehydroemetine.

The product was made into a paste by adding the same to 500 ml. of 50 percent aqueous ethanol and stirring the resultant mixture for a period 1 hour at 40°. The so-stirred mixture was then filtered and dried to a constant weight in a vacuum drying oven at 50°. The so-dried product was found to have the composition of

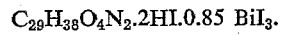
$$C_{29}H_{38}O_4N_2 \cdot 2HI \cdot 0.85\ BiI_3.$$

The potassium bismuth iodide solution utilized above was prepared by dissolving 10 grams of bismuth oxide in 100 ml. of a saturated aqueous potassium iodide solution at room temperature, diluting the so-formed solution with 250 ml. of glacial acetic acid and filtering the resultant product.

*Example 3*

The free base, (-)-2-dehydroemetine, obtained from 1 gram of (-)-2-dehydroemetine dihydrobromide as in Example 1, was dissolved in 5.2 ml. of glacial acetic acid. To the resultant solution, there was added with stirring at about 40°, 7.8 ml. of potassium bismuth iodide solution, said last-mentioned solution having been prepared in the manner set forth in Example 2. The stirring was continued for a period of 1 hour. An orange-red precipitate which appeared was separated by filtration, washed with water and dried. The powder obtained on drying was added to 4.3 ml. of a water-ethanol mixture (3:1) and the resultant mixture was stirred for a period of 1 hour at 40°. The resulting paste was filtered and dried yielding the bismuth iodide complex of (-)-2-dehydroemetine containing (—)-2-dehydroemetine, $BiI_3$, and HI in a proportion of 1:1.41:1.05.

*Example 4*

The active complex prepared by the procedure exemplified in Example 1 was encapsulated by conventional techniques into capsules resistant to gastric juices. Each capsule contained

|  | Mg. |
|---|---|
| Active material | 51.53 |
| Talc | 123.47 |
|  | 175.00 |
| Lacquer | 15.00 |
|  | 190.00 |

I claim:

The bismuth iodide complex of the hydroiodic acid addition salt of racemic 2-dehydroemetine.

References Cited by the Examiner

UNITED STATES PATENTS

| 2,513,793 | 7/1950 | Frommel | 260—270 |
| 2,970,999 | 2/1961 | Rudner | 260—270 |
| 3,121,720 | 2/1964 | Barton et al. | 260—288 |

OTHER REFERENCES

Burger: "Medicinal Chemistry," 2nd edition, Interscience (1960), pages 855 and 1204 relied on.

Osol et al.: Dispensatory of the U.S., Part I, 25th ed., Lippincott, 1955, page 498 relied on.

ALEX MAZEL, *Primary Examiner.*

HENRY R. JILES, *Examiner.*

DONALD G. DAUS, *Assistant Examiner.*